(12) United States Patent
Farb et al.

(10) Patent No.: US 9,255,567 B2
(45) Date of Patent: Feb. 9, 2016

(54) TWO-BLADED VERTICAL AXIS WIND TURBINES

(75) Inventors: Daniel Farb, Beit Shemesh (IL); Joe Van Zwaren, Beit Shemesh (IL); Avner Farkash, Beit Shemesh (IL); Ken Kolman, Beit Shemesh (IL)

(73) Assignee: Leviathan Energy Wind Lotus Ltd., Beit Shemesh (IL)

( * ) Notice: Subject to any disclaimer, the term of this patent is extended or adjusted under 35 U.S.C. 154(b) by 1063 days.

(21) Appl. No.: 13/322,578

(22) PCT Filed: May 26, 2010

(86) PCT No.: PCT/IB2010/052334
§ 371 (c)(1),
(2), (4) Date: Mar. 15, 2012

(87) PCT Pub. No.: WO2010/136975
PCT Pub. Date: Dec. 2, 2010

(65) Prior Publication Data
US 2013/0142657 A1 Jun. 6, 2013

Related U.S. Application Data

(60) Provisional application No. 61/180,949, filed on May 26, 2009, provisional application No. 61/224,925, filed on Jul. 13, 2009, provisional application No. 61/244,083, filed on Sep. 21, 2009.

(51) Int. Cl.
*F03D 3/02* (2006.01)
*F03D 3/06* (2006.01)
*F03D 11/04* (2006.01)
*F03D 1/04* (2006.01)

(52) U.S. Cl.
CPC ...... *F03D 3/061* (2013.01); *F03D 1/04* (2013.01); *F03D 3/062* (2013.01); *F03D 11/04* (2013.01); *F05B 2220/7068* (2013.01); *F05B 2240/301* (2013.01); *F05B 2240/40* (2013.01); *F05B 2250/71* (2013.01); *F05B 2280/5008* (2013.01); *Y02E 10/28* (2013.01); *Y02E 10/728* (2013.01); *Y02E 10/74* (2013.01)

(58) Field of Classification Search
CPC ............ F03D 3/02; F03D 3/06; F03D 3/061; F03D 3/062; F03D 9/002; F03D 11/04; F03D 11/045; F05B 2230/601; F05B 2240/51; F05B 2240/213; F05B 2240/302
USPC ........... 415/4.2, 4.4; 416/132 B, 175, 197 A, 416/241 R, 242, 243, DIG. 9
See application file for complete search history.

(56) References Cited

U.S. PATENT DOCUMENTS

| | | | | |
|---|---|---|---|---|
| 4,624,624 | A * | 11/1986 | Yum | 416/87 |
| 6,283,711 | B1 * | 9/2001 | Borg et al. | 416/135 |
| 6,935,841 | B2 * | 8/2005 | Rainbow | 416/175 |
| 7,189,050 | B2 * | 3/2007 | Taylor et al. | 415/1 |
| 8,297,930 | B2 * | 10/2012 | Bertony | 416/176 |
| 2004/0061337 | A1 * | 4/2004 | Becker | 290/44 |
| 2006/0120872 | A1 * | 6/2006 | Okubo et al. | 416/132 B |
| 2008/0286112 | A1 * | 11/2008 | Rowan et al. | 416/244 R |
| 2010/0207452 | A1 * | 8/2010 | Saab | 307/65 |
| 2011/0006543 | A1 * | 1/2011 | Hu | 290/55 |

* cited by examiner

*Primary Examiner* — Edward Look
*Assistant Examiner* — Jason Davis
(74) *Attorney, Agent, or Firm* — Mark M. Friedman

(57) ABSTRACT

Two-bladed vertical axis wind turbines (VAWT) have many efficiency advantages over turbines with other numbers of blades. Principles for making them in the ideal fashion are presented for both drag and lift configurations.

16 Claims, 17 Drawing Sheets

Figure 8
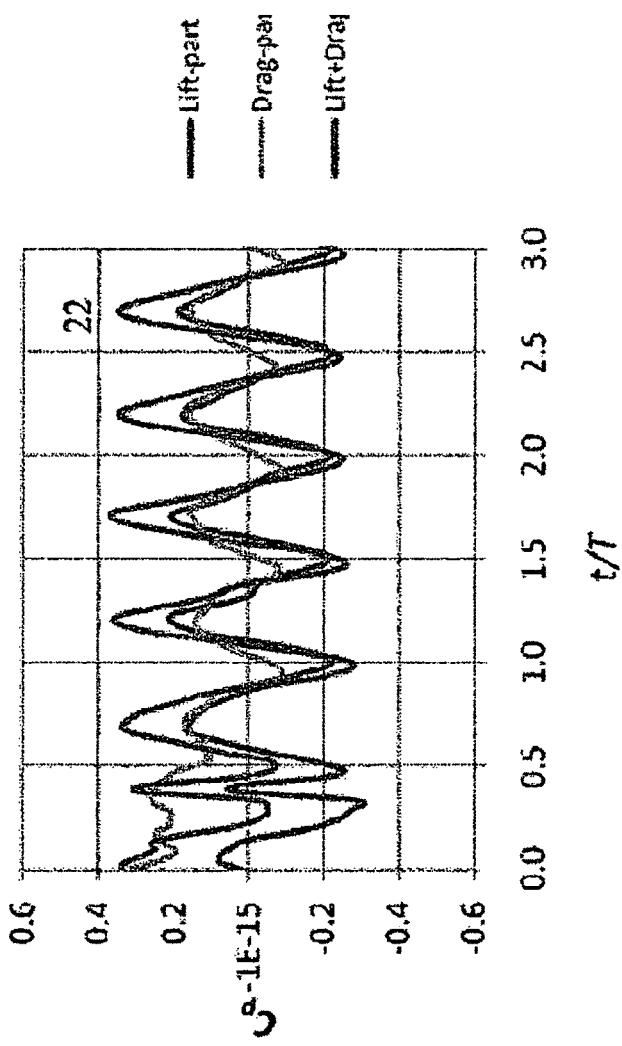
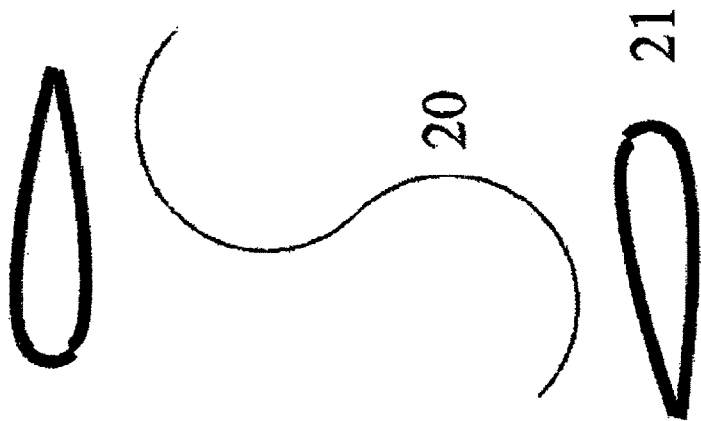

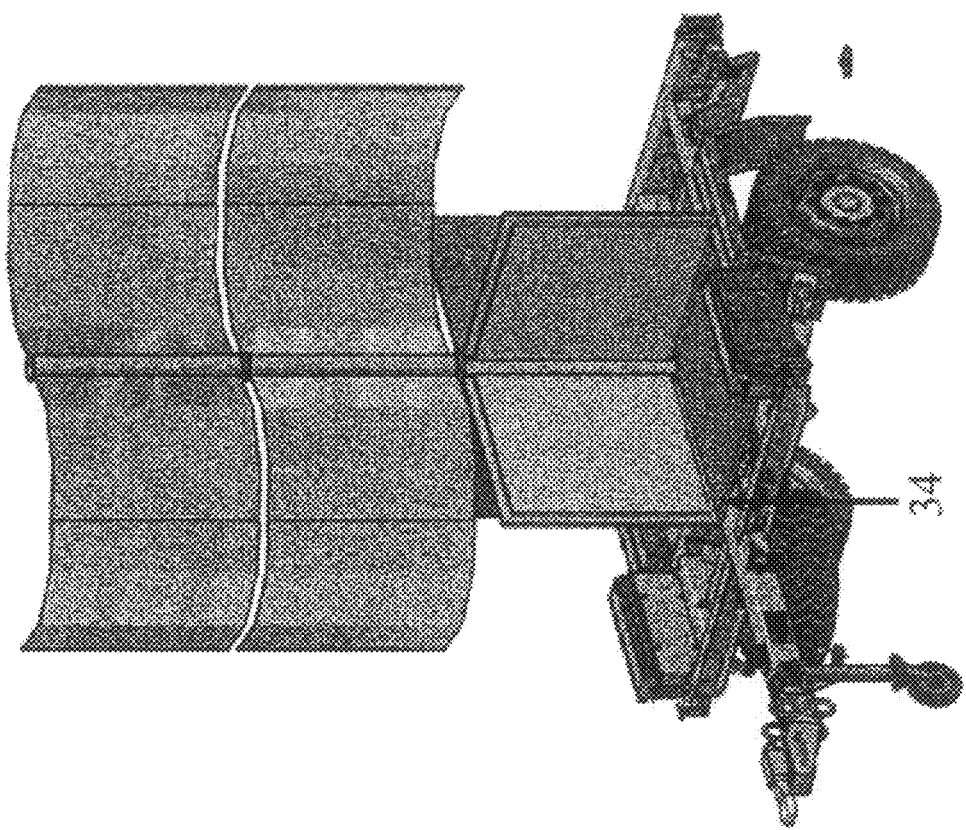

TWO-BLADED VERTICAL AXIS WIND TURBINES

FIELD AND BACKGROUND OF THE INVENTION

The present invention relates to a two-bladed vertical axis turbine, particularly for wind, although the same principles apply to other fluids. We have found on simulations that such turbines have higher efficiencies than similar ones with different numbers of blades, for both drag and lift configurations, and the present application describes innovative ways to improve their performance and construction. Some of these principles apply to turbines with different numbers of blades. The two-bladed concept can be extended to two sets of two blades on the same level. This is particularly advantageous in combining drag and lift type blades to achieve the advantages of both. Large lift blades take on rpm characteristics of drag type blades; thus one of the innovations of the current application is defining how they can function together.

BRIEF DESCRIPTION OF THE DRAWINGS

The invention is herein described, by way of example only, with reference to the accompanying drawings, wherein:

FIG. 8 is a diagram of a two blade drag plus lift turbine.

FIGS. 11-17 are diagrams of the steps of assembly of a wind turbine in a cubicle.

DESCRIPTION OF THE PREFERRED EMBODIMENTS

The present invention consists of several components of making higher efficiency and more practical two-bladed VAWTs.

Definitions: Although this application refers to wind, it really can apply to all fluids. Specific examples of rpm are dependent on fluid density, so they do not apply to liquids. Here they refer to standard sea level wind conditions and need to be adjusted appropriately for different circumstances. Rpm means "revolutions per minute" and refers to the speed of revolution of the turbine. VAWT is a vertical axis wind turbine. The term "stackable blades" refers to blades made of modular pieces that can be easily extended in at least one direction by attaching an additional piece. Cp is "coefficient of power" and refers to the efficiency of a turbine, where 1.0 is perfect efficiency. Most turbine are limited by the Betz equation to a maximum of 0.6 Cp. A drag turbine operates from the "push" of the wind, and a lift turbine operates like a wing by creating pressure differentials that draw the blades. The Savonius type with an open central area is considered drag but has a small lift component. A vertical edge of a blade can serve as a lip-equivalent if it is designed to curve at the trailing edge in such a way that it contains the fluid in a fashion similar to a lip.

The principles and operation of a VAWT according to the present invention may be better understood with reference to the drawings and the accompanying description.

Figure 1:
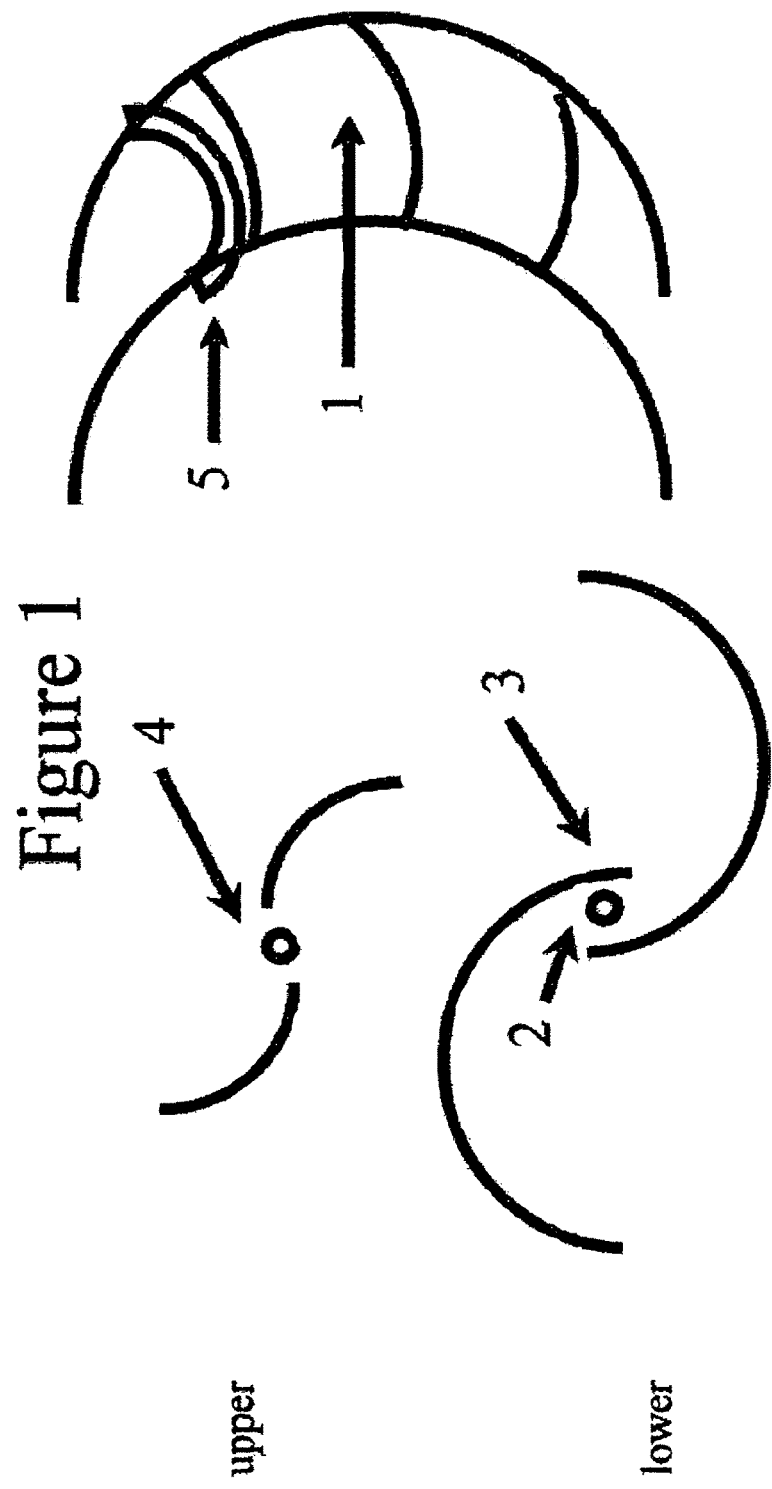
FIG. 1 is a diagram of a two-bladed, double-curved set of blades.

Referring now to the drawings, FIG. 1 illustrates a two-bladed, double-curved set of blades. Part (1) illustrates the shape of the blades. This is an advantageous configuration over prior art, wherein a Savonius type of single curve in the shape of half a cylinder has been standard. This means that the streamlining will be not only to the sides as with the traditional overlapping half-cylinder shape, but also above and below. This will result in less opposition to flow from the side moving into the wind and will help the side benefiting from the wind to absorb it better.

Part (2) is the shaft, and part (3) is the lower part of a blade in horizontal plane cross-section. In one embodiment of a two-bladed, double-curved set of blades, the blades taper at the top, as shown in part (4), wherein the overlap across the shaft has been removed. This shape confers advantages in terms of capturing the wind in different ways. A way to amplify the effect of a turbine's double-curved blades is to place horizontal lips (5) at regular intervals along the double-curved structure. This results in more efficiency as it minimizes unwanted three-dimensional effects. It needs to be emphasized that these are not strengthening ribs. They are thin, horizontal structures of ideally around 5 cm extending substantially over the breadth of the blades.

The lip referred to extends a minimum of 3 centimeters horizontally per meter of height from one lip or edge to the next. It functions to prevent the vertical movement of air from decreasing the power production by at least 5%.

Figure 9:
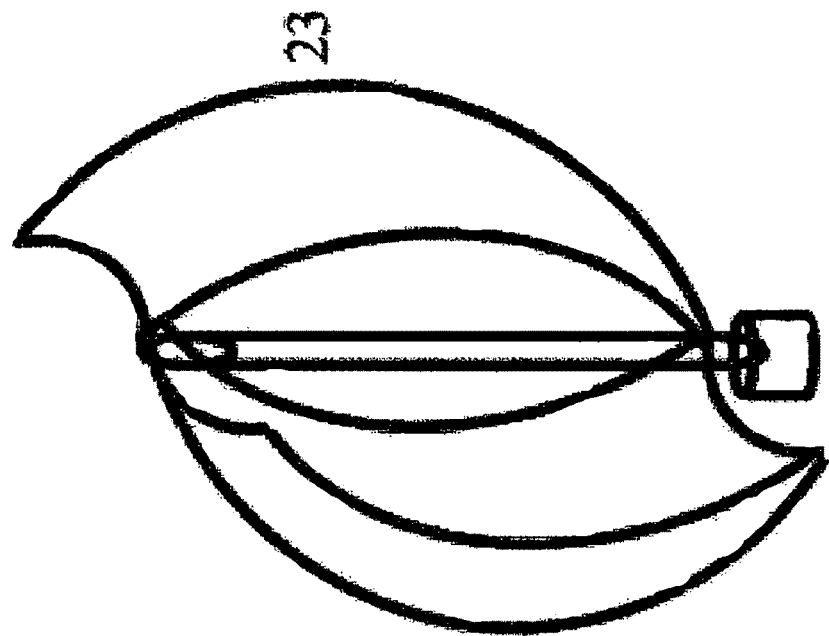
FIG. 9 is a diagram of a two-bladed double-curve variation.

FIG. 9 is a diagram of a two-bladed double-curve variation (23).

Figure 2:
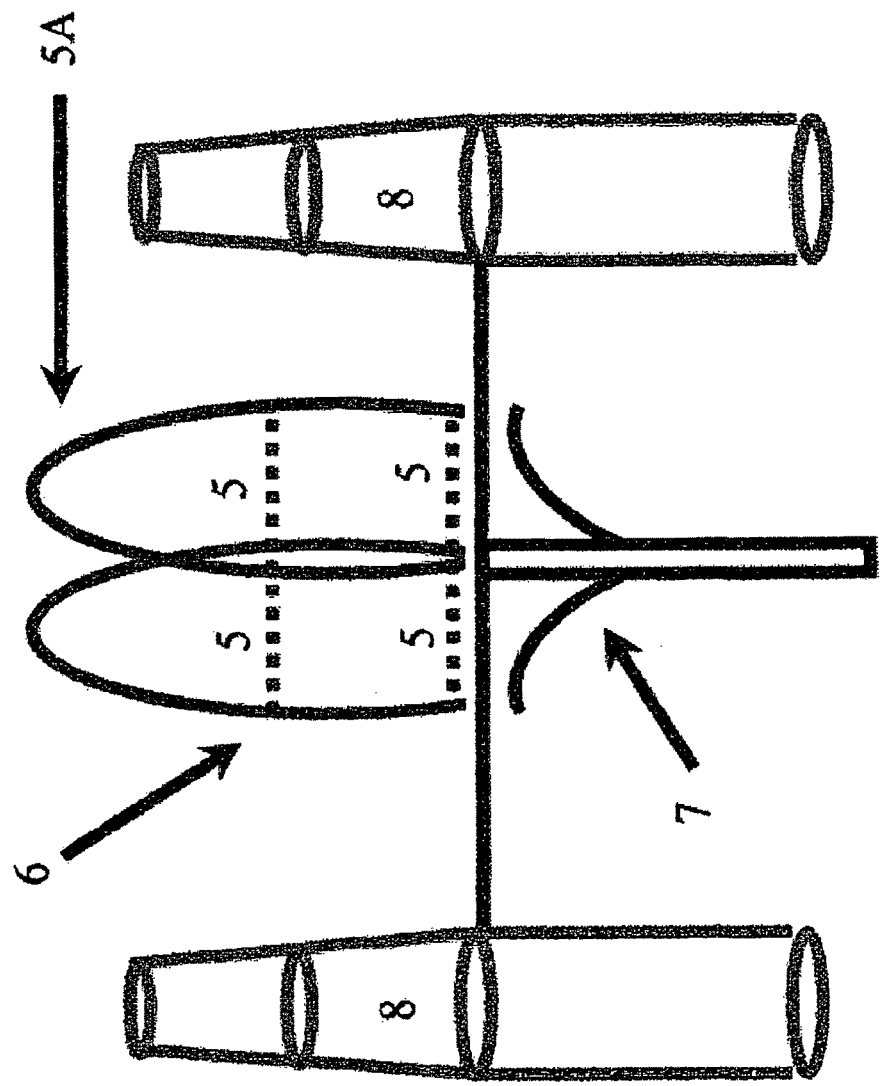
FIG. 2 is a diagram of a two-bladed, double-curved set of blades as part of a vertical axis turbine system.

FIG. 2 is a diagram of a two-bladed, double-curved set of blades (5A) as part of a vertical axis turbine system. The concept is that the unique advantages of the two-bladed mostly drag system in FIG. 1 can be part of a larger system of blades that is predominantly lift (8). One of the advantages is self-starting at low speeds. If appropriately separated, they can act to enhance the total performance of the system. Pan (8) does not require the same vertical dimensions as (5A) and it can also taper in one embodiment. Location (6) shows lips (5) on the blades (5A). Optional airfoils to affect the wind patterns, in one embodiment of a two-bladed, double-curved set of blades may be added to the system, whether or not it contains part (8).

Such a blade shape may in one embodiment be used with a two-bladed design. In one embodiment, the method of manufacturing is to divide each two-way curved blade into sections for cheaper production.

The association of an inferior foil and a double-curved blade is significant and novel since the higher acceleration produced by the foil can be dissipated more easily when moving against the wind. Either a Savonius internal gap or no internal gap blade system can be used in this context.

Figure 3:
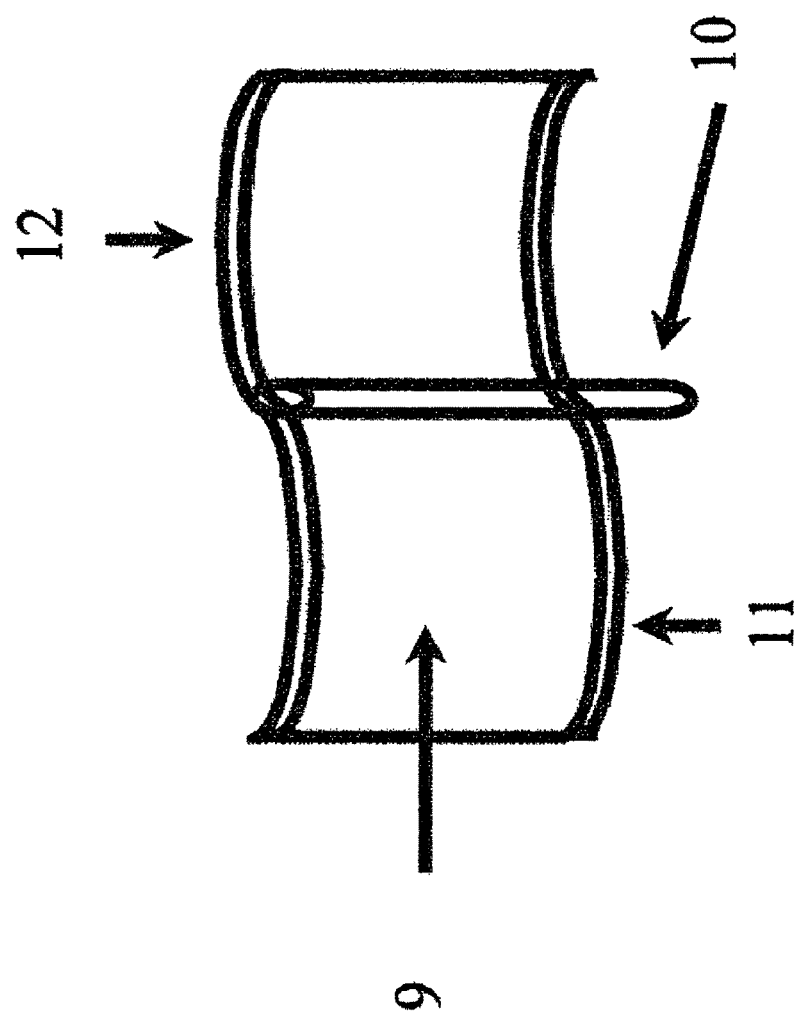
FIG. 3 is a diagram of an S-shaped vertical axis turbine.

FIG. 3 is a diagram of an S-shaped vertical axis turbine (9), riding on a shaft (10), for gas or liquid in different embodiments, with lips on the top (12), bottom (11), or both, in order to form a cup for the fluid flow and increase the power. This is useful for any drag or twist configuration, and in one embodiment for a two-bladed turbine. Said lip should be substantially congruent with the curvature of the blade. In one embodiment it is perpendicular to the axis of the shaft; in another embodiment it is angled.

Figure 4:
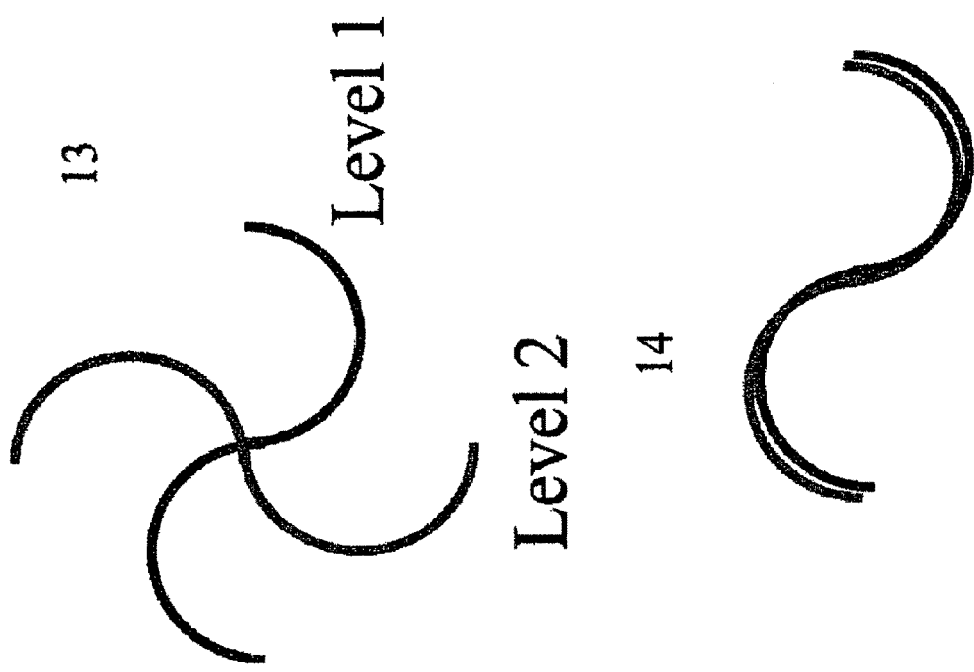
FIG. 4 is a diagram of stackable S blades.
Figure 7:
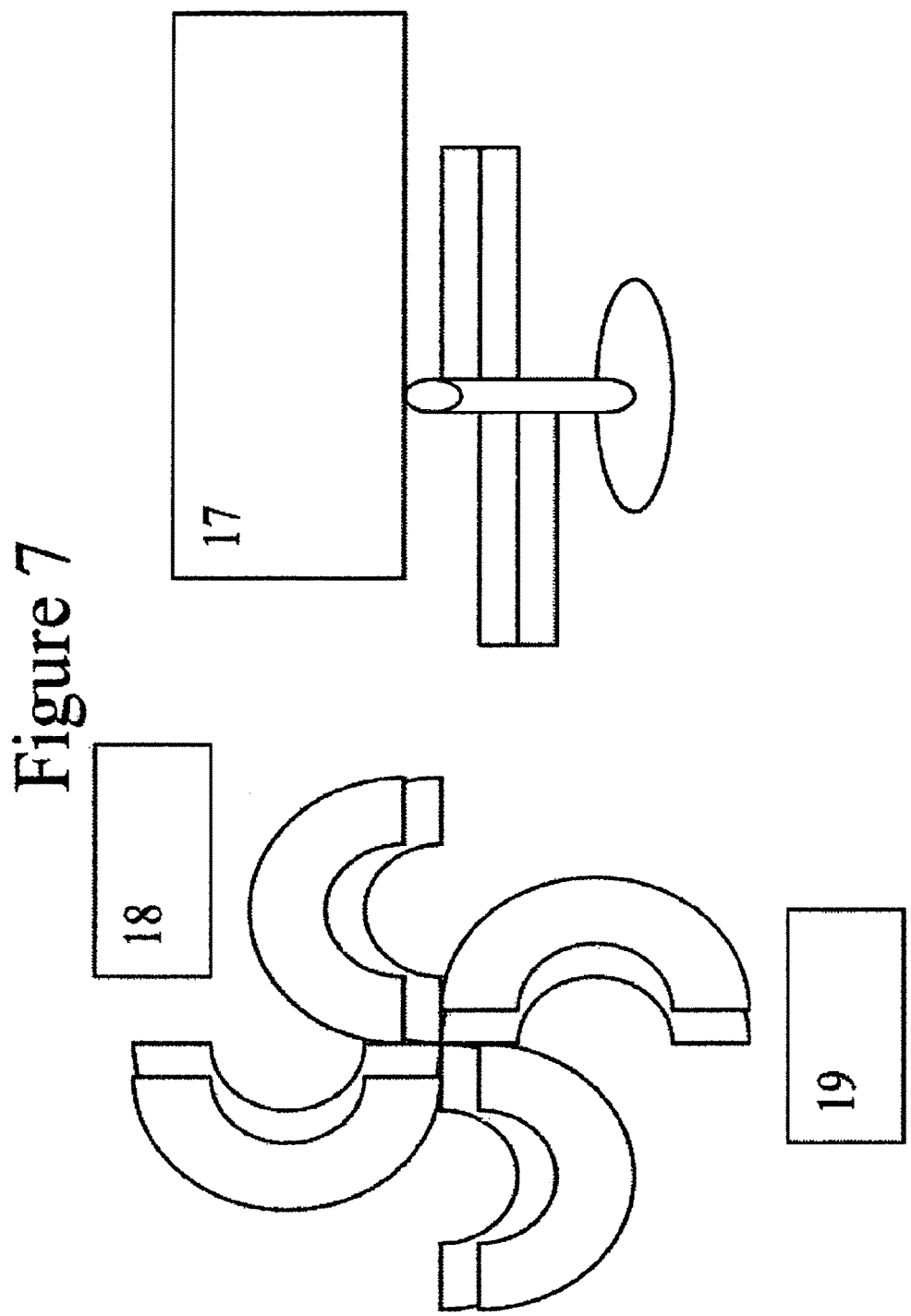
FIG. 7 is a diagram of an example of stacking deployment.

FIG. 4 is a diagram of stackable S blades (13). (By S blades, we include a Savonius or Savonius-like configuration as they form a pattern close to an S.) It addresses the problem of making blades for small turbines small enough to fit inside elevators, containers, etc., and it also enables easy adaptation of the turbine height to different wind environments. Such stackability is an important advantage in mass production of a standard wind turbine that needs to be adapted to local circumstances. Here it is illustrated with a solid two-blade drag system but can be done with other blade systems as well, both drag and lift. The upper and lower pictures show how two blades can be used at different orientations so as to capture wind more continuously from any side. This is another advantage of stacking in addition to the convenience of assembly. For example, if the height of the blades is 2 meters, it might be divided into 1-meter segments. The segments can be stacked directly on top of each other, or not directly on top of each other. When not directly on top of each other, each segment may have at least one lip. The vertically stackable blade system has an additional advantage: an extra level can be added to installations where extra power is desired. This stackability can apply to lift-type blades as well FIG. 7 is a diagram of an example of stacking for quick deployment. The VAWT can be pulled up vertically in part (17) with making an S shape on two levels (18 and 19) and the levels can be at different orientations. In one embodiment, the shaft can connect to a pancake base with magnets and coils.

The total shape of the segments can make a double curve. An embodiment of that is where a middle segment is vertical, so that additional vertical middle segments can be added in order to easily increase the height of the blade system.

Figure 10:
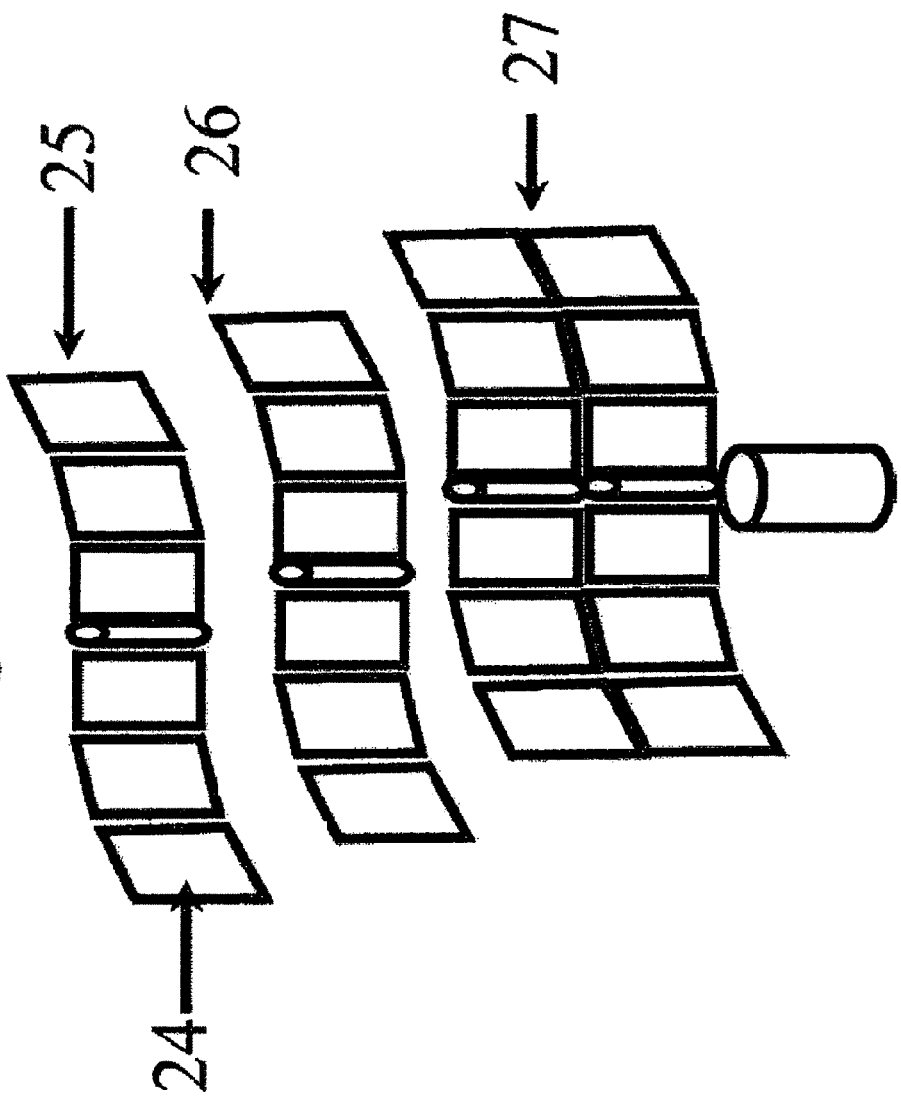
FIG. 10 is a diagram of stacked plates.
Figure 11:
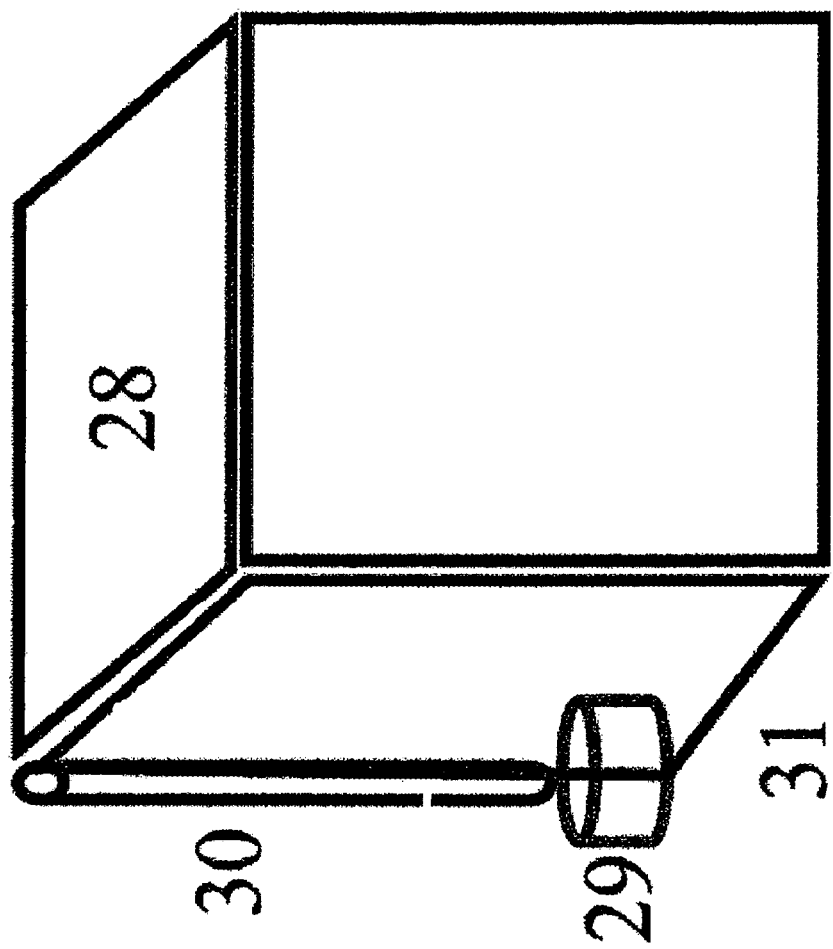

Another type of stacking is horizontal as well. FIG. 10 illustrates combined horizontal and vertical stacking. A series of connected individual plates (24) can be combined horizontally to form each level of a turbine's blades. Then each level (25, 26) can be added vertically to form a higher turbine (27).

Figure 12:
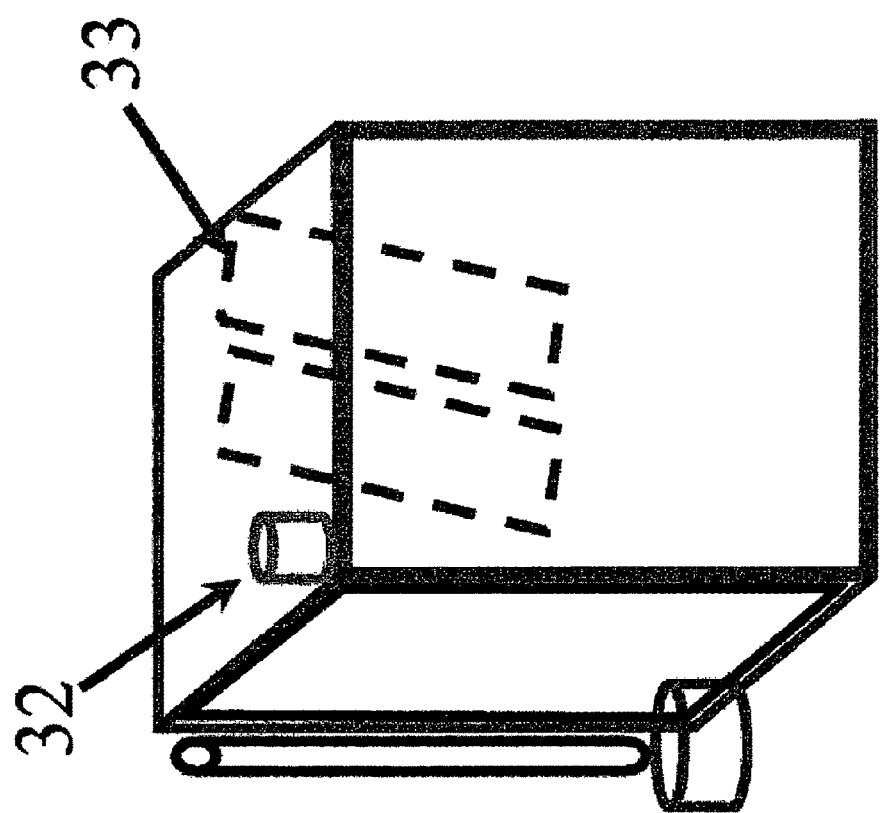
Figure 13:
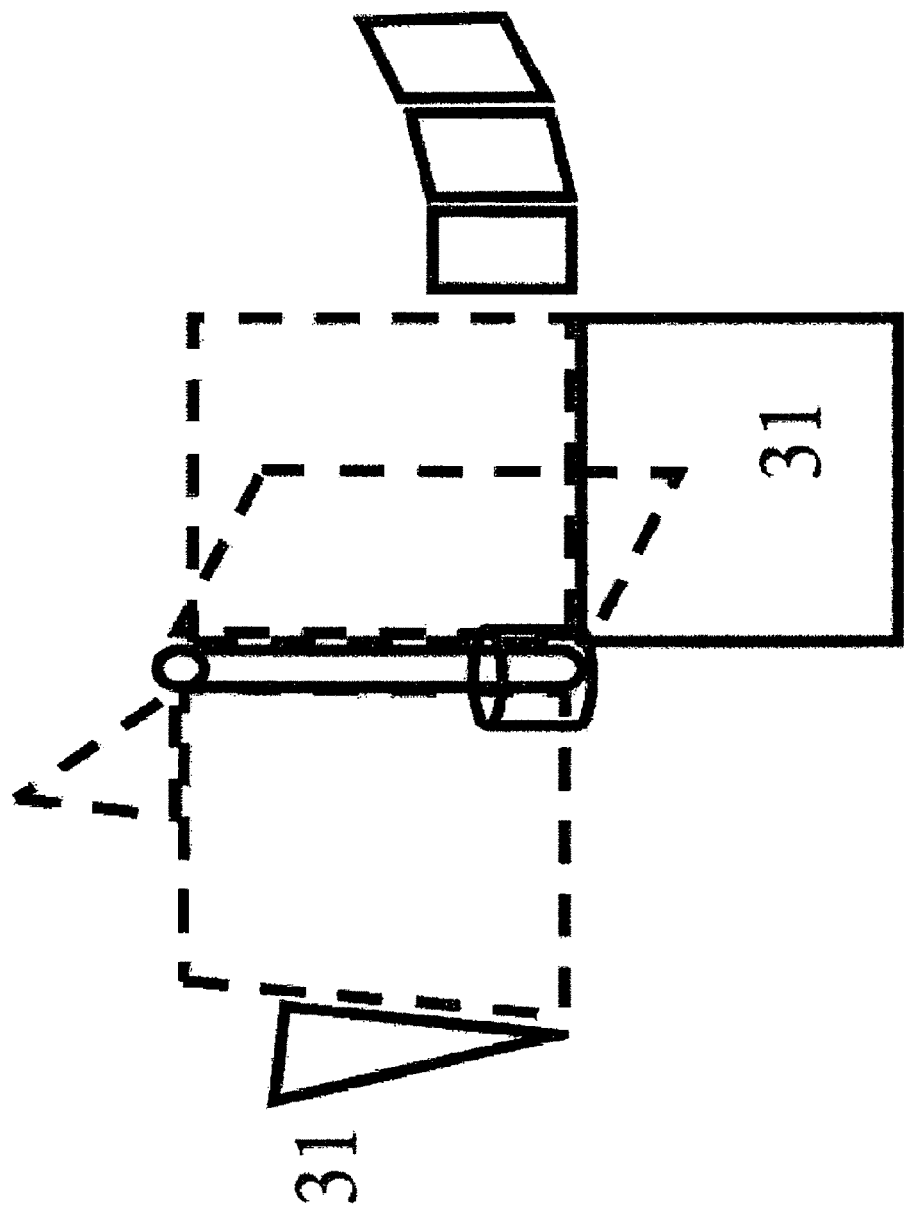
Figure 14:
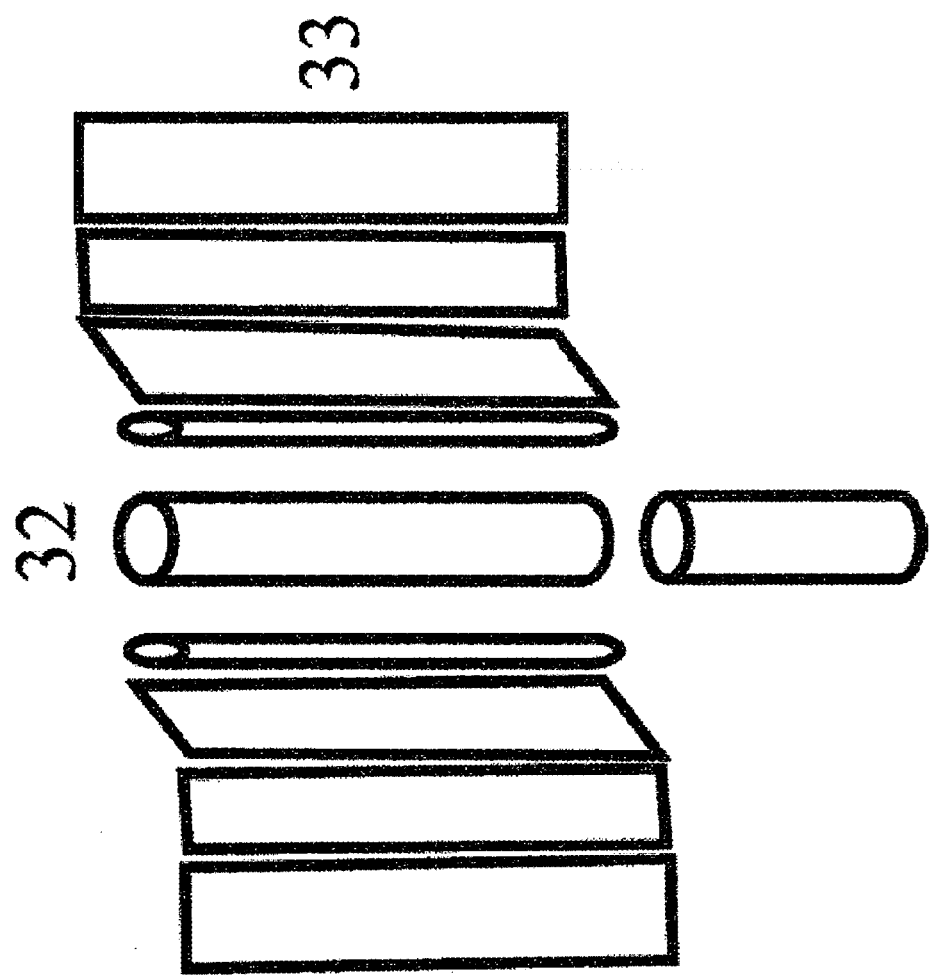
Figure 15:
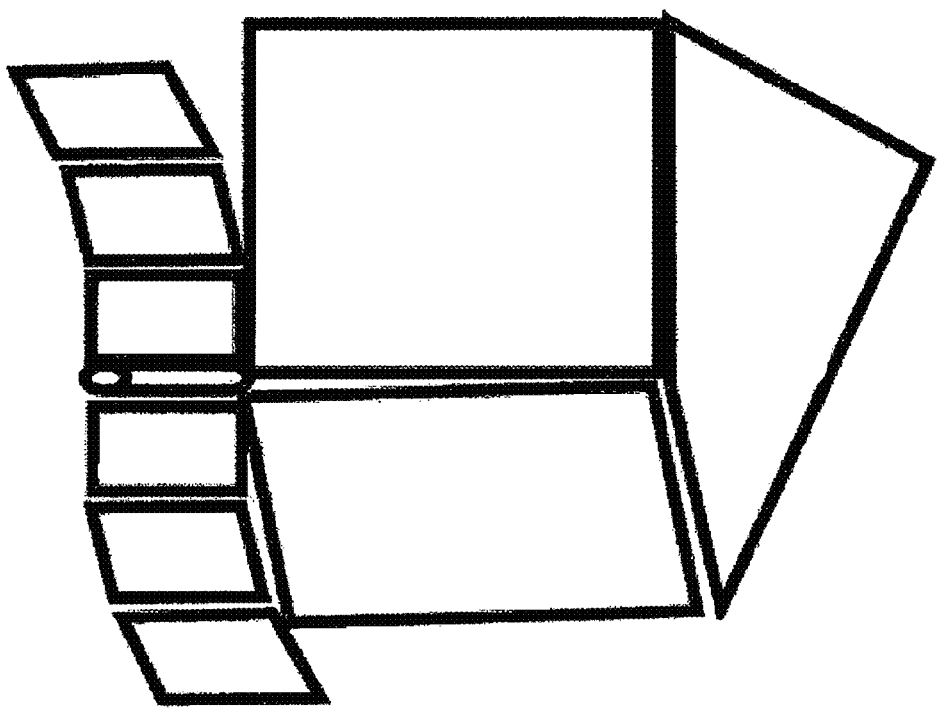
Figure 16:
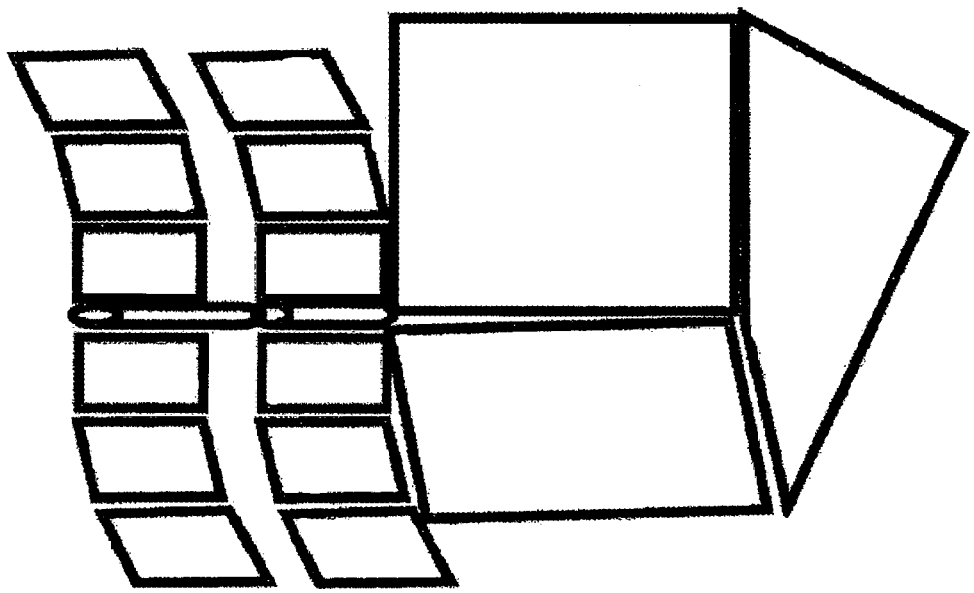

FIGS. 11-17 illustrate a quick deployment system utilizing stacking. A cubicle (28) comprises everything needed for setting up a wind turbine. Here the generator (29) and shaft support (30) are built into the cubicle. The outside of the cubicle forms the base (31). FIG. 13 shows how the rest of the base (31) is formed by the rest of the outside of the cubicle. FIG. 12 is a view of the inside of the cubicle that shows shaft pieces (32) and blade pieces (33). FIGS. 14, 15, and 16 show the assembly of these pieces to make a turbine. FIG. 17 shows that the base formed of the cubicle can have means of attachment (34) to a vehicle or other base such as the ground. Typical means of attachment can include bolts, pegs, joints, etc.

Figure 5:
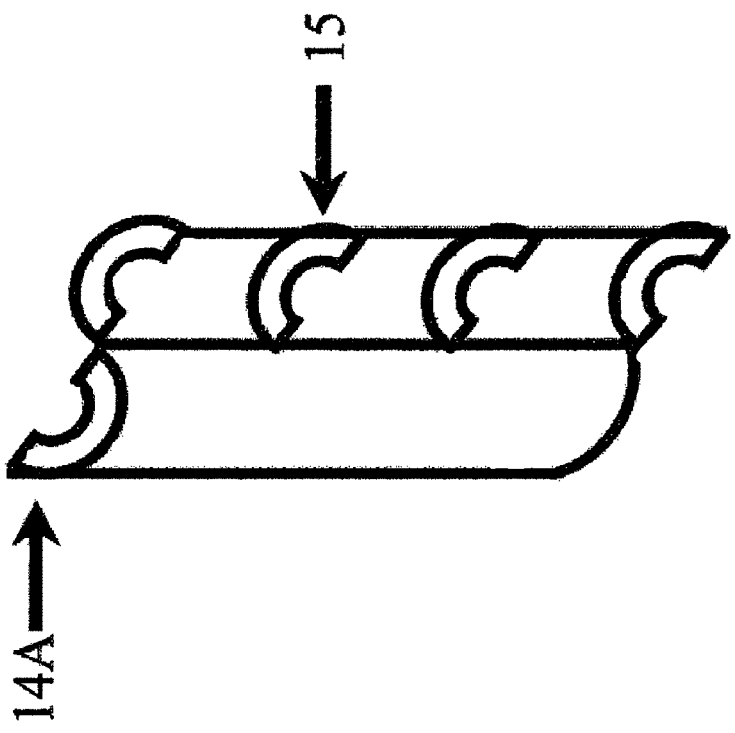
FIG. 5 is a diagram of lips on a single curve.

FIG. 5 is a diagram of lips on a single curve. It shows lips on the upper and lower edges (14A) and on the middle (15).

Figure 6:
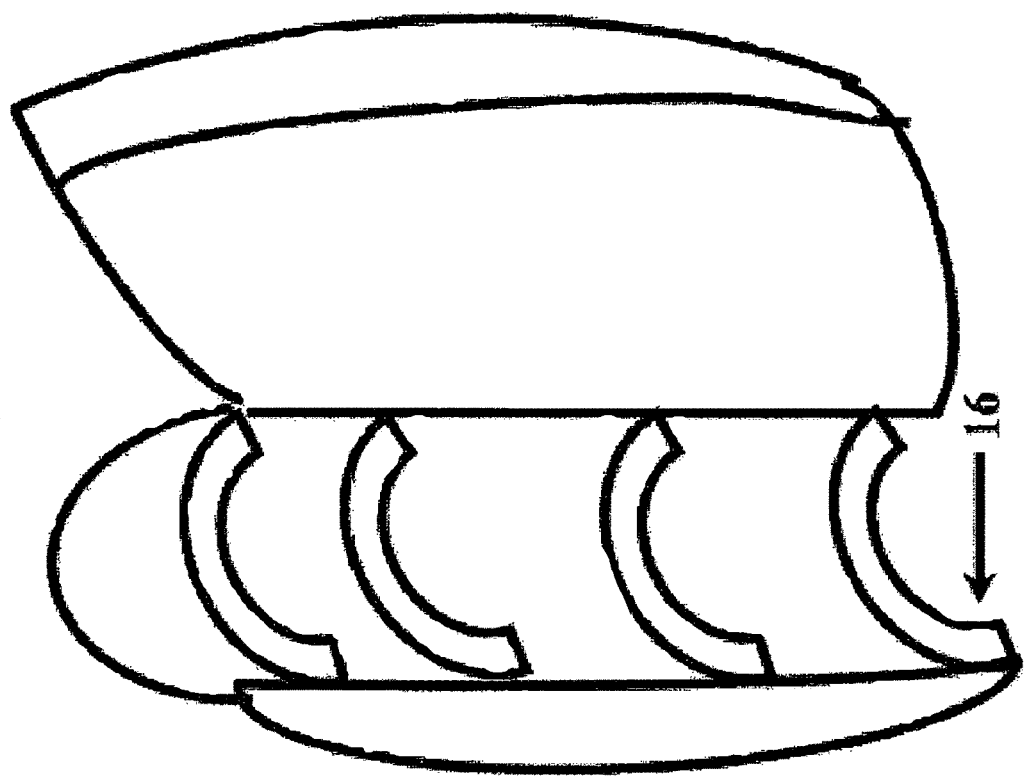
FIG. 6 is a diagram of lips on a double curve.

FIG. 6 is a diagram of lips (16) on a double curve. In FIG. 6, the distance from the base to the top lip is 2580 mm. The upper edge of the double curve functions as if it were a lip because of its shape. We have found this distribution of lips produces near maximum power. So if we consider 5 effective lips within a vertical height of close to 3 meters, the ideal distance between lips is every 0.6 meters, plus or minus 0.2 meters.

FIG. 8 is a diagram of a combined two-bladed drag (20) plus two-bladed lift (21) turbine. The characteristics of such a VAWT are that the lift blade or blades has an rpm similar to the drag blade or blades on one turbine. Example: at 10 m/s, a 2-bladed drag turbine of 2.5 meters diameter has a Cp (coefficient of power) of 0.29 at 76 rpm, and a set of two lift blades with a chord of 0.95 should have an rpm of 86. This could be combined with a level of drag-type configuration, so that there is no problem with self-starting, while the large lift type blades would add much more power. In fact, the graph on the right shows that line (22) has the greatest power output with a Cp approaching 0.4.

Our simulations show that two-bladed, large lift blades have a higher power coefficient than many other configurations, particularly in the proportion of chord/turbine diameter of 0.7/2.5 and greater.

We found the performance of symmetrical foil shapes such as NACA 0018 to be superior to other shapes for the performance of lift blades, particularly in association with two blades and a large chord. The effects of the number of blades and chord are shown in the next tables (wind velocity=10 m/s) in a two-dimensional simulation. N=number of blades. C=chord length.

| | Power (watt) | | | | | | | | | | | |
|---|---|---|---|---|---|---|---|---|---|---|---|---|
| | N = 2 c (m) | | | | N = 3 c (m) | | | | N = 4 c (m) | | | |
| RPM | 0.25 | 0.5 | 0.6 | 0.75 | 0.25 | 0.5 | 0.6 | 0.75 | 0.25 | 0.5 | 0.6 | 0.75 |
| 48 | | | | 219 | 116 | 65 | 292 | | | | | |
| 95 | | 602 | 926 | | | 689 | 882 | 923 | | 568 | | |
| 115 | | | | | | | 952 | 829 | | | | |
| 124 | | | | 1119 | | | | | | 561 | | |
| 143 | | 629 | 1003 | 1136 | | | 837 | 729 | | 581 | | |
| 162 | | | | 1031 | | | | | | 494 | | |
| 191 | | 771 | 1030 | 938 | 192 | 785 | 684 | 16 | 456 | 303 | | |
| 220 | | | | | | 674 | | | 685 | | | |
| 239 | | 965 | 820 | 542 | 767 | | | | 655 | | | |
| 258 | | | | | | | | | 490 | | | |
| 286 | | 305 | 257 | | 445 | −335 | −1271 | | 291 | −1400 | | |
| 334 | | | | | 17 | | | | | | | |
| 382 | | | | | −386 | | | | | | | |

| | Cp | | | | | | | | | | | |
|---|---|---|---|---|---|---|---|---|---|---|---|---|
| | c (m) | | | | c (m) | | | | c (m) | | | |
| RPM | 0.25 | 0.5 | 0.6 | 0.75 | 0.25 | 0.5 | 0.6 | 0.75 | 0.25 | 0.5 | 0.6 | 0.75 |
| 48 | | | | 0.07 | 0.04 | 0.02 | 0.10 | | | | | |
| 95 | | 0.20 | 0.31 | | | 0.23 | 0.29 | 0.31 | | 0.19 | | |
| 115 | | | | | | | 0.32 | 0.28 | | | | |
| 124 | | | | | | | | | | 0.19 | | |

-continued

```
143   0.21  0.33  0.38              0.28  0.24        0.19
162                                                    0.16
191   0.26  0.34  0.31  0.06  0.26  0.23  0.01  0.15  0.10
220                     0.22                    0.23
239   0.32  0.27  0.18  0.25                    0.22
258                                             0.16
286   0.10  0.09        0.15 -0.11 -0.42        0.10 -0.47
334                     0.01
382                    -0.13
```

The following simulations were made for two lift blades for a diameter of 2.5 meters.

| | Power (Watt) | |
|---|---|---|
| | c (m) | |
| RPM | 0.85 | 0.95 |
| 48 | 411 | 455 |
| 67 | 949 | 960 |
| 86 | 1359 | 1439 |
| 105 | 1314 | 1396 |
| 124 | 1330 | 1373 |
| 143 | 1153 | 1110 |

| | Cp (power coefficient) | |
|---|---|---|
| | c (m) | |
| RPM | 0.85 | 0.95 |
| 48 | 0.11 | 0.12 |
| 67 | 0.25 | 0.25 |
| 86 | 0.36 | 0.38 |
| 105 | 0.34 | 0.36 |
| 124 | 0.35 | 0.36 |
| 143 | 0.30 | 0.29 |

The above shows that for parameters of height of 2.5 meters and diameter of 2 meters, 2 blades have the potential for more power production than 3.

For 3 blades, the ideal chord/turbine diameter is approximately 0.6/2=0.3.

For 2 blades, the ideal chord/turbine diameter is approximately 0.95/2.5=0.38.

The ideal rpm for a 2-blade configuration of chord 0.95 meters and of 2-3 meters diameter is 50-100. The ideal rpm for a 3-blade configuration of chord 0.5-0.6 meters and of 2-3 meters diameter is 100-200.

While the invention has been described with respect to a limited number of embodiments, it will be appreciated that many variations, modifications and other applications of the invention may be made.

SUMMARY OF THE INVENTION

The present invention successfully addresses the shortcomings of the presently known configurations by providing a series of improvements in the design and deployment of vertical axis turbines, particularly two-bladed ones.

It is now disclosed for the first time a vertical axis turbine, comprising:

a. Two similar-sized blades, each constructed as a double curve.

In one embodiment, the system further comprises:

b. At least one lip, defined as a thin horizontal structure of at least three centimeters for each meter of height from one lip to the next, extending substantially across the horizontal extent of the trailing portion of the blades.

According to another embodiment, the lip occurs substantially every 0.6 meters of elevation, plus or minus 0.2 meters.

According to another embodiment, at least one end of the blades is tapered.

According to another embodiment, the blades overlap across the central shaft.

According to another embodiment, the blades do not overlap across the central shaft.

In one embodiment, the system further comprises:

b. an inferior foil.

In one embodiment, the system further comprises b. An additional set of lift blades.

According to another embodiment, the lift blades have substantially the same maximally effective rpm (within 20%) as the two double-curved blades.

It is now disclosed for the first time a vertical axis turbine, comprising:

a. At least one blade with at least one lip.

According to another embodiment, said lip is of a size sufficient to prevent the vertical movement of air from decreasing the power production by more than 5%.

In one embodiment, the system further comprises b. A two bladed, single-curve set of blades.

According to another embodiment, the blade's pieces connect at the location of the lips.

According to another embodiment, said lip is substantially congruent with the angle and curvature of the blade, thin, and perpendicular to the axis of the shaft.

According to another embodiment, said lip is substantially congruent with the angle and curvature of the blade, thin, and not perpendicular to the axis of the shaft.

It is now disclosed for the first time a vertical axis turbine, comprising:

a. Stackable blades.

According to another embodiment, the blades are vertically stackable.

According to another embodiment, the blades are horizontally stackable.

According to another embodiment, the blades are both horizontally and vertically stackable.

According to another embodiment, the blades are comprised of at least two connected plates that fold at their interface.

According to another embodiment, the blades are stacked directly on top of each other According to another embodiment, the blades are not stacked directly on top of each other In one embodiment, the system further comprises b. A substantially flat base with magnets and a coil.

According to another embodiment, the stackable blade forms a double curve, and at least one of the central segments is vertically straight.

According to another embodiment, each stackable level has lips at least at the lower and upper edges.

It is now disclosed for the first time a wind turbine in a box, comprising:

a. A cubicle with a generator and shaft support attached to a base, said exterior of the cubicle comprising the base and shaft support, b. Shaft pieces of a size that enable fitting within said cubicle, and which enable blade stacking, c. Blade pieces of a size that enable fitting within said cubicle.

In one embodiment, the system further comprises d. An attachment means from the turbine base to a vehicle or other base.

It is now disclosed for the first time a vertical axis turbine, comprising:

a. An internal set of drag blades, b. An external set of lift blades, wherein the maximally efficient rpm of the two sets are within 20% of each other.

It is now disclosed for the first time a vertical axis wind turbine, comprising:

a. A substantially symmetrical lift foil shape, with a chord/turbine diameter ratio (CTDR) of 0.25-0.35 for 3 blades, and 0.25-0.45 for 2 blades.

In one embodiment, the system further comprises:

b. A generator, when the wind is at a speed of 10 meters per second, operating most efficiently at a rpm plus or minus 25% of 10 divided by the product of "pi" and the turbine diameter. The concept here is to align the speed of rotation with the proportionally large blades at typical sizes for small vertical axis wind turbines.

What is claimed is:

1. A vertical axis turbine, comprising:
   at least one curved blade of the drag type including a leading portion and a trailing portion, the at least one curved blade including at least two lips, each of the lips configured for reducing three-dimensional aerodynamic effects on the turbine, and, each of the lips defined as a horizontal structure substantially corresponding to the curvature of the trailing portion of the at least one curved blade, extending along the trailing portion of the blade so as to be spaced apart from each other at regular intervals, and, protruding from the trailing portion of the blade.

2. The turbine of claim 1, wherein at least one curved blade has a single curvature.

3. The turbine of claim 1, wherein at least one curved blade has a double curvature.

4. The turbine of claim 3, wherein at least one end of the at least one curved blade is tapered.

5. The turbine of claim 1, wherein the at least one curved blade includes component pieces and the component pieces connect at one of the lips.

6. The turbine of claim 1, wherein each lip occurs approximately every 0.6 meters of length.

7. The turbine of claim 1, additionally comprising a central shaft and wherein the at least one curved blade includes two curved blades that overlap across the central shaft.

8. The turbine of claim 7, wherein the overlap is on the lower portion of the curved blades.

9. The turbine of claim 7, wherein the two curved blades are horizontally stackable.

10. The turbine of claim 1, further comprising:
    b. at least a second blade of the lift type.

11. The turbine of claim 10, wherein the at least one lift blade has substantially the same maximally effective revolutions per minute as the drag blades.

12. The turbine of claim 1, further comprising:
    b. a cubicle with a generator and shaft support attached to a base, a shaft attached to the shaft support, and the at least one blade attached to the shall, the exterior of the cubicle comprising the base and shaft support, and,
    c. the at least one curved blade including pieces of a size less than the inside dimensions of the cubicle.

13. The turbine of claim 1, additionally comprising a shaft and wherein the lips are substantially perpendicular to the shaft.

14. The turbine of claim 1, additionally comprising a shaft and wherein the lips are at a non-perpendicular angle to the shaft.

15. The turbine of claim 1, wherein said lips are substantially congruent with the angle and curvature of the at least one curved blade.

16. The turbine of claim 1, wherein each of the lips extends for approximately three centimeters for each approximate meter of blade length.

* * * * *